(12) United States Patent
Hu et al.

(10) Patent No.: US 9,803,881 B2
(45) Date of Patent: Oct. 31, 2017

(54) METHOD FOR CONTROLLING AIR OUTPUT VOLUME

(71) Applicant: ZHONGSHAN BROAD-OCEAN MOTOR CO., LTD., Zhongshan (CN)

(72) Inventors: Ge Hu, Zhongshan (CN); Xiansheng Zhang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 238 days.

(21) Appl. No.: 14/930,624

(22) Filed: Nov. 2, 2015

(65) Prior Publication Data

US 2016/0054025 A1  Feb. 25, 2016

Related U.S. Application Data

(62) Division of application No. 13/748,618, filed on Jan. 24, 2013, now abandoned.

(30) Foreign Application Priority Data

Apr. 26, 2012 (CN) .......................... 2012 1 0127208

(51) Int. Cl.
*F24F 11/00* (2006.01)
*G05B 19/04* (2006.01)
*G05D 23/13* (2006.01)
*F24F 11/047* (2006.01)
(Continued)

(52) U.S. Cl.
CPC .......... *F24F 11/0079* (2013.01); *F04D 25/08* (2013.01); *F04D 27/004* (2013.01); *F24F 11/0001* (2013.01); *F24F 11/047* (2013.01); *G05B 19/041* (2013.01);
(Continued)

(58) Field of Classification Search
CPC .. F24F 11/0079; F24F 11/047; F24F 11/0001; G05B 19/041; G05B 2219/2614; G05D 23/1393; F04D 27/004; F04D 25/08; Y02B 30/746
See application file for complete search history.

(56) References Cited

U.S. PATENT DOCUMENTS

5,931,001 A * 8/1999 Watanabe ............. F24F 5/0042
165/54
6,994,620 B2 * 2/2006 Mills ...................... F24F 11/006
454/255
(Continued)

*Primary Examiner* — Charles Kasenge
(74) *Attorney, Agent, or Firm* — Matthias Scholl, PC; Matthias Scholl (57) ABSTRACT

A method for controlling air volume including: 1) inputting a target air volume into a microprocessor control unit of a motor controller; 2) starting a motor by the motor controller and allowing the motor to work in a steady state under a rotational speed; 3) recording the torque and rotational speed in the steady state, establishing a functional relation formula Q=F (T, n, V) for calculating the air volume, and calculating an air volume in the steady state; 4) comparing the target air volume with the calculated air volume; 5) re-recording a steady torque after the motor falls on a new steady state under an increased or reduced rotational speed, and recalculating the air volume in the new steady state; and 6) repeating steps 4) and 5) to adjust the rotational speed until the calculated air volume is equal or equivalent to the target air volume.

20 Claims, 5 Drawing Sheets

(51) Int. Cl.
*F04D 25/08* (2006.01)
*F04D 27/00* (2006.01)

(52) U.S. Cl.
CPC . *G05D 23/1393* (2013.01); *G05B 2219/2614* (2013.01); *Y02B 30/746* (2013.01)

(56) References Cited

U.S. PATENT DOCUMENTS

| | | | | |
|---|---|---|---|---|
| 8,672,733 | B2* | 3/2014 | Chen | F04D 27/004 236/49.3 |
| 2008/0188173 | A1* | 8/2008 | Chen | F04D 27/004 454/239 |
| 2013/0288589 | A1* | 10/2013 | Hu | F24F 11/047 454/256 |
| 2014/0133999 | A1* | 5/2014 | Hu | F24F 11/047 417/44.1 |

* cited by examiner

METHOD FOR CONTROLLING AIR OUTPUT VOLUME

CROSS-REFERENCE TO RELATED APPLICATIONS

This application is a divisional of U.S. Ser. No. 13/748,618 filed on Jan. 24, 2013 now pending, which claims the benefit of Chinese Patent Application No. 201210127208.0 filed Apr. 26, 2012, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for controlling air volume provided by a motor and by an air-conditioning fan system.

Description of the Related Art

In an indoor ventilation duct of a household air-conditioner, static pressure often changes because of dust deposition in a duct or blockage of a filter. The static pressure is often higher than the standard static pressure for a nominal system in a manufacturer laboratory. Constant air volume control can provide constant air volume for users under such cases, so as to maintain the comfortable ventilating, cooling or heating effect under broad static pressure conditions.

To realize constant air volume, an air volume meter can be installed. However, this increases the cost and the risk of failure. In addition, rotational speed can be adjusted by monitoring the changes of static pressure. A typical method for determination of the air volume is to directly measure the external static pressure, which requires that the relationship between the static pressure and air volume is measured in advance, then the torque of a motor is calculated under the static pressure corresponding to the specified air volume, and speed adjustment is carried out by monitoring the changes of static pressure. This, however, requires a powerful microprocessor control unit (MCU), which further increases the cost.

SUMMARY OF THE INVENTION

In view of the above-described problems, it is one objective of the invention to provide a method for controlling air volume provided by a motor. The method features high efficiency, high speed, high control accuracy, simple and convenient mathematical model for air volume calculation, and low implementation cost, and can automatically adapt to a wide range of static pressures.

To achieve the above objective, in accordance with one embodiment of the invention, there is provided a method for controlling air volume provided by a motor, the method comprising:

1) testing a relationship between air volume and torque of a motor system under different constant rotational speed values, and establishing a functional relation formula $Q=F(T, n, V)$ for calculating the air volume, Q representing the air volume, T representing the torque, n representing the rotational speed, V representing an adjustment coefficient, and each rotational speed section having a corresponding adjustment coefficient which is input to a microprocessor control unit of a motor controller;
2) inputting a target air volume $Q_{ref}$ into the microprocessor control unit of the motor controller;
3) starting the motor by the motor controller and allowing the motor to work in a steady state under a certain rotational speed;
4) recording the torque T and rotational speed n in the steady state, acquiring the adjustment coefficient V under the rotational speed n through a table look-up method, and calculating an air volume $Q_c$ in the steady state according to the functional relation formula in step 1);
5) comparing the target air volume $Q_{ref}$ with the calculated air volume $Q_c$ by the microprocessor control unit of the motor controller, and a) maintaining the rotational speed and allowing the motor to work in the steady state and recording the torque T when the target air volume $Q_{ref}$ is equal or equivalent to the calculated air volume $Q_c$; or b) increasing the rotational speed n through the motor controller when the target air volume $Q_{ref}$ is greater than the calculated air volume $Q_c$, or c) decreasing the rotational speed n through the microprocessor control unit of the motor controller when the target air volume $Q_{ref}$ is smaller than the calculated air volume $Q_c$;
6) re-recording a steady torque after the motor falls on a new steady state under an increased or reduced rotational speed, re-searching the corresponding adjustment coefficient V by the motor controller through the table look-up method, and recalculating the air volume $Q_c$ in the new steady state; and
7) repeating step 5) and step 6) to adjust the rotational speed until the calculated air volume $Q_c$ is equal or equivalent to the target air volume $Q_{ref}$, and recording the torque T in the steady state after the motor falls on the steady state.

In a class of this embodiment, step 7) is followed by step 8), that is, when the torque and the air output volume change due to the alteration of an external system, the motor controller compares the new steady torque with the torque in step 5) or step 7) to acquire the change of air output volume, and then steps 4), 5), 6), and 7) are repeated.

In a class of this embodiment, the functional relation formula $Q=F(T, n, V)$ is acquired as follows according to raw data of torque and air volume parameters under a base rotational speed $n_{base}$ and other rotational speed values and under different external static pressures: arranging the motor fixed on a blower wheel in an air-conditioning device, allowing the motor to work in the constant rotational speed, selecting a plurality of rotational speed values comprising the base rotational speed within the maximum rotational speed, allowing the motor to work under different rotational speed values, and changing the external static pressure of the system in sequence to collect the raw data comprising the torque and the air volume parameters.

In accordance with another embodiment of the invention, there is provided a method for controlling air volume provided by an air-conditioning fan system, the air-conditioning fan system comprises a blower wheel and a motor, the motor comprises a motor controller, a stator component, and a rotor component, and the method comprising:

1) allowing the motor to work at a constant rotational speed state, selecting a plurality of rotational speed values comprising a base rotational speed within a range without exceeding the maximum rotational speed, allowing the motor to work under different rotational speed values, and changing the external static pressure of the system in sequence to collect the raw data comprising torque and air volume parameters;

2) establishing a functional relation formula Q=F (T, n, V) for calculating the air volume, Q representing the air volume, T representing the torque, n representing the rotational speed, V representing an adjustment coefficient, and each rotational speed section having a corresponding adjustment coefficient which is input to a microprocessor control unit of the motor controller;

3) inputting a target air volume $Q_{ref}$ into the microprocessor control unit of the motor controller;

4) starting the motor by the motor controller and allowing the motor to work in a steady state under a certain rotational speed;

5) recording the torque T and the rotational speed n in the steady state, acquiring the adjustment coefficient V under the rotational speed n through a table look-up method, and calculating an air volume $Q_c$ in the steady state according to the functional relation formula in step 1);

6) comparing the target air volume $Q_{ref}$ with the calculated air volume $Q_c$ by the microprocessor control unit of the motor controller, and a) maintaining the rotational speed and allowing the motor to work in the steady state and recording the torque T when the target air volume $Q_{ref}$ is equal or equivalent to the calculated air volume $Q_c$; or b) increasing the rotational speed n through the motor controller when the target air volume $Q_{ref}$ is greater than the calculated air volume $Q_c$, or c) decreasing the rotational speed n through the microprocessor control unit of the motor controller when the target air volume $Q_{ref}$ is smaller than the calculated air volume $Q_c$;

7) re-recording a steady torque after the motor falls on a new steady state under an increased or reduced rotational speed, re-searching the corresponding adjustment coefficient V by the motor controller through the table look-up method, and recalculating the air volume $Q_c$ in the new steady state; and 8) repeating step 6) and step 7) to adjust the rotational speed until the calculated air volume $Q_c$ is equal or equivalent to the target air volume $Q_{ref}$, and recording the torque T in the steady state after the motor falls on the steady state.

In a class of this embodiment, step 8) is followed by a step 9), that is, when the torque and the air output volume change due to the alteration of an external system, the motor controller compares the new steady torque with the torque in step 6) or step 8) to acquire the change of air output volume, and then steps 5), 6), 7), and 8) are repeated.

In a class of this embodiment, a calculation formula for calculating air volume is as follows:

$$Q = c0 \times \frac{n \times V}{n_{base}} + c1 \times T \times \frac{n_{base}}{n \times V},$$

or $$Q = c0 \times \frac{n \times V}{n_{base}} + c1 \times T \times \frac{n_{base}}{n \times V} + c2 \times T^2 \times \left(\frac{n_{base}}{n \times V}\right)^3,$$

in which coefficients c0, c1, and c2 are obtained by a curve fitting method under different external static pressures of base rotational speed $n_{base}$ according to the raw data of the torque and air volume parameters.

In a class of this embodiment, the base rotational speed $n_{base}$ ranges from 30% $n_{max}$ to 80% $n_{max}$, and $n_{max}$ represents a maximum rotational speed of the motor.

In a class of this embodiment, the value of the adjustment coefficient V in the functional relation formula Q=F (T, n, V) ranges from 0.1 to 2.

In a class of this embodiment, that the calculated air volume $Q_c$ is equal or equivalent to the target air volume $Q_{ref}$ in step 5) and step 7) means that the calculated air volume $Q_c$ is in the range of "target air volume $Q_{ref}$±error window", and the error window of the target air volume $Q_{ref}$ ranges from 1% to 2%.

In a class of this embodiment, increasing or decreasing the rotational speed n through the motor controller in step 6) means increasing or decreasing the rotational speed n according to step length sequence of at least 1% $n_{max}$ each time, or new rotational speed=current rotational speed× (target air volume $Q_{ref}$/current calculated air volume $Q_c$).

Advantages of the method of the invention are summarized below:

1) The motor works at constant rotational speeds, and a plurality of rotational speed values comprising the base rotational speed are selected without exceeding the rated rotational speed, so that the motor works under different rotational speed values. The external static pressure of the system is changed in sequence for collecting the original date comprising the rotational speed and air volume parameters, and the function relation formula Q=F(T, n, V) for calculating air volume is obtained according to the raw data of the rotational speed and air volume parameters under different external static pressures and different torques. The mathematical model for calculating air volume only has a first-order or second-order function, thus the method high efficiency, high speed, high control accuracy, simple and convenient mathematical model for air volume calculation, and low implementation cost; through a lot of experiments and tests, the error of air volume is controlled in the range of 0.5%-5%; and 2) The method is practicable at a wide range of static pressures, and the air volume is calculated through measuring the external static pressure of the system, so that the structure of the product is simplified, and the cost is reduced.

BRIEF DESCRIPTION OF THE DRAWINGS

The invention is described hereinbelow with reference to accompanying drawings, in which.

DETAILED DESCRIPTION OF THE EMBODIMENTS

Figure 1:
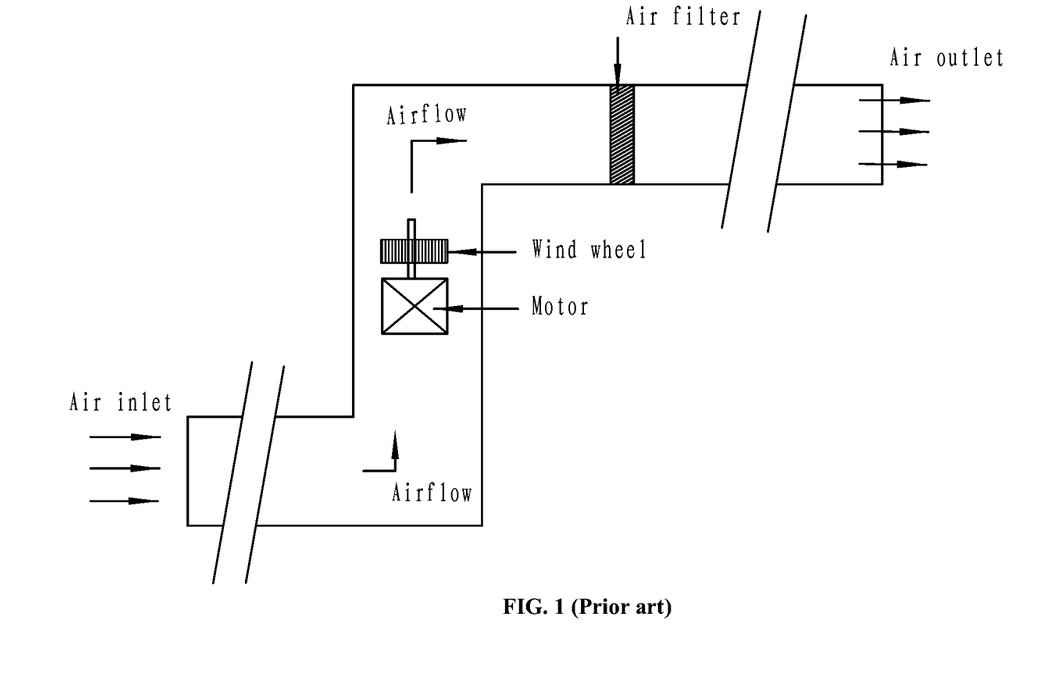
FIG. 1 is a structure diagram of a traditional air-conditioning fan system.

As shown in FIG. 1, a blower system (e.g., a gas furnace or an air handler, which is replaced with "motor+blower wheel" in the figure) is installed in a typical air-conditioning ventilation duct. An air filter is arranged in the duct. Air-blasting is started when the motor is started. The numbers of air outlets and air inlets are related to that of rooms, and there is no unified standard to design ducts. Meanwhile, the filter may have different pressure drops, and the blower system carrying a traditional single-phase AC motor (PSC motor) is positioned in a different duct, thus the actual air volume will be different.

Figure 2:
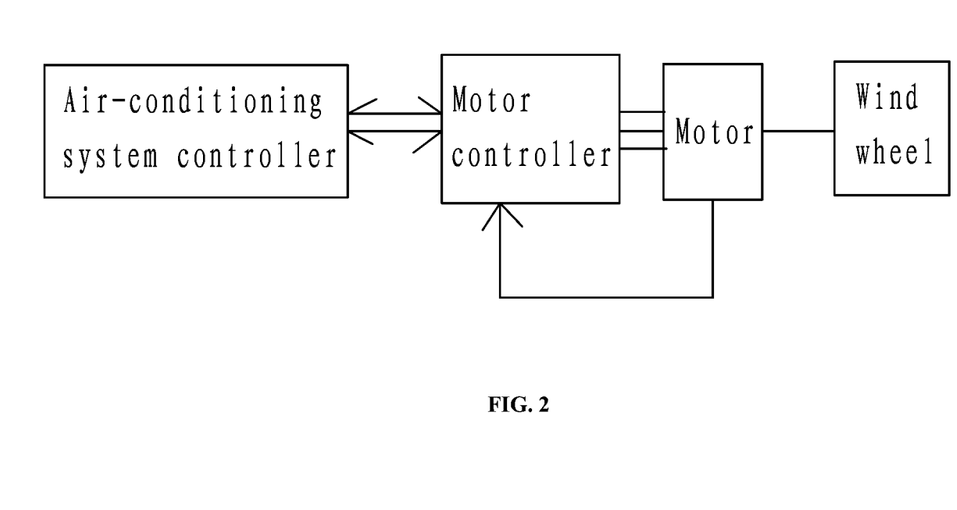
FIG. 2 is a control flowchart of an air conditioning system of in accordance with one embodiment of the invention.

As shown in FIG. 2, an electronically commutated motor (ECM) is employed to drive the blower wheel to rotate, and comprises a motor controller. The motor controller is connected to and communicates with an air-conditioning system controller, for example, the air-conditioning system controller sends the target air volume to the motor controller, and the motor controller controls the motor to drive the blower wheel to rotate, so as to output the target air volume, equivalently to the control of air volume.

Figure 3:
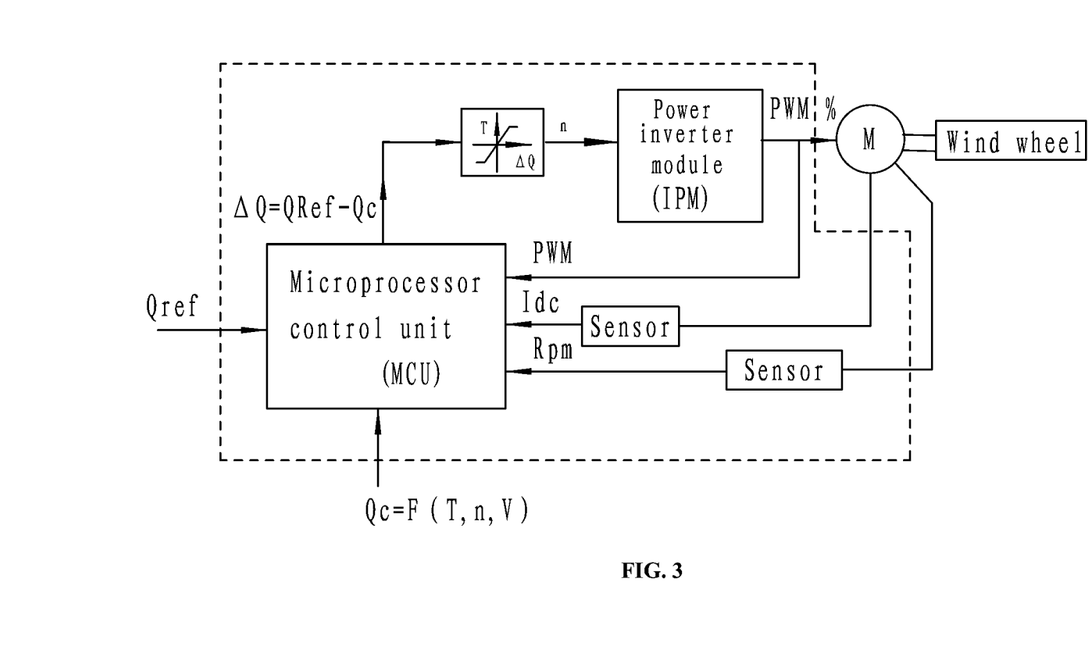
FIG. 3 is a functional block diagram of a method for controlling air volume in accordance with one embodiment of the invention.

As shown in FIG. 3, the air-conditioning system controller inputs the target air volume $Q_{ref}$ to a microprocessor control unit of the motor controller, the motor controller comprises a sensor, a microprocessor control unit, and a power inverter module. The sensor inputs a rotational speed signal RPM and a current signal $I_{dc}$ of the motor to the microprocessor control unit. A PWM (Pulse-Width Modulation) signal output by the power inverter module is also sent to the microprocessor control unit for processing. Every coefficient involved in a functional relation formula $Q=F(T, n, V)$, a comparison table for corresponding adjustment coefficients V under different working torques, are input to the microprocessor control unit of the motor controller in advance. The microprocessor control unit compares the target air volume $Q_{ref}$ with the calculated air volume $Q_c$ for adjusting the output signals, and the torque is used as controlled amount for indirectly controlling air volume. When the target air volume $Q_{ref}$ is greater than the calculated air volume $Q_c$, the output rational speed n is increased through the motor controller. When the target air volume $Q_{ref}$ is smaller than the calculated air volume $Q_c$, the output rational speed n is reduced through the microprocessor control unit of the motor controller. After the motor enters a steady state, the steady torque T under the increased or reduced rational speed is re-recorded. The motor controller is used for re-searching the corresponding adjustment coefficients V through a table look-up method. The calculated air volume $Q_c$ is recalculated. The rational speed adjustment is stopped until the calculated air volume $Q_c$ is equal or equivalent to the target air volume $Q_{ref}$, and then the motor enters a steady state, i.e., the constant air volume state. The target air volume $Q_{ref}$ is a fixed value, however, in the microprocessor control unit, when the calculated air volume $Q_c$ is adjusted to the range of "target air volume $Q_{ref}$±error window", it is regarded that the requirement is met, and adjustment is stopped. The advantage is that the repeated adjustment due to small perturbations is avoided and the stable air volume is achieved. The error window of the target air volume $Q_{ref}$ generally ranges from 1% to 2%.

Technical scheme of a method for controlling air volume provided by an air-conditioning fan system of the invention is summarized as follows.

Also provided is a method for controlling air volume provided by an air-conditioning fan system, the air-conditioning fan system comprising a blower wheel and a motor, the motor comprising a motor controller, a stator component, and a rotor component, and the method comprising:

1) allowing the motor to work in a constant rotational speed state, selecting a plurality of rotational speed values comprising a base rotational speed within the maximum rotational speed, allowing the motor to work under different rotational speed values, and changing the external static pressure of the system in sequence to collect the raw data comprising torque and air volume parameters;
2) establishing a functional relation formula $Q=F(T, n, V)$ for calculating the air volume, Q representing the air volume, T representing the torque, n representing the rotational speed, V representing an adjustment coefficient, and each rotational speed section having a corresponding adjustment coefficient which is input to a microprocessor control unit of the motor controller;
3) inputting a target air volume $Q_{ref}$ into the microprocessor control unit of the motor controller;
4) starting the motor by the motor controller and allowing the motor to work in a steady state under a certain rotational speed;
5) recording the torque T and the rotational speed n in the steady state, acquiring the adjustment coefficient V under the rotational speed n through a table look-up method, and calculating an air volume $Q_c$ in the steady state according to the functional relation formula in step 1);
6) comparing the target air volume $Q_{ref}$ with the calculated air volume $Q_c$ by the microprocessor control unit of the motor controller, and a) maintaining the rotational speed and allowing the motor to work in the steady state and recording the torque T when the target air volume $Q_{ref}$ is equal or equivalent to the calculated air volume $Q_c$; or b) increasing the rotational speed n through the motor controller when the target air volume $Q_{ref}$ is greater than the calculated air volume $Q_c$, or c) decreasing the rotational speed n through the microprocessor control unit of the motor controller when the target air volume $Q_{ref}$ is smaller than the calculated air volume $Q_c$;
7) re-recording a steady torque after the motor falls on a new steady state under an increased or reduced rotational speed, re-searching the corresponding adjustment coefficient V by the motor controller through the table look-up method, and recalculating the air volume $Q_c$ in the new steady state; and
8) repeating step 6) and step 7) to adjust the rotational speed until the calculated air volume $Q_c$ is equal or equivalent to the target air volume $Q_{ref}$, and recording the torque T in the steady state after the motor falls on the steady state.

Step 8) is followed by a step 9), that is, when the torque and the air output volume change due to the alteration of an external system, the motor controller compares the new steady torque with the torque in step 6) or step 8) to acquire the change of air output volume, and then steps 5), 6), 7), and 8) are repeated.

A calculation formula for calculating air volume is as follows:

$$Q = c0 \times \frac{n \times V}{n_{base}} + c1 \times T \times \frac{n_{base}}{n \times V},$$

or $$Q = c0 \times \frac{n \times V}{n_{base}} + c1 \times T \times \frac{n_{base}}{n \times V} + c2 \times T^2 \times \left(\frac{n_{base}}{n \times V}\right)^3,$$

in which coefficients c0, c1, and c2 are obtained by a curve fitting method under different external static pressures of base rotational speed $n_{base}$ according to the raw data of the torque and air volume parameters.

The base rotational speed $n_{base}$ ranges from 30% $n_{max}$ to 80% $n_{max}$, and $n_{max}$ represents the maximum rotational speed of the motor.

The value of the adjustment coefficient V in the functional relation formula Q=F (T, n, V) ranges from 0.1 to 2.

That the calculated air volume $Q_c$ is equal or equivalent to the target air volume $Q_{ref}$ in step 5) and step 7) means that the calculated air volume $Q_c$ is in the range of "target air volume $Q_{ref}$±error window", and the error window of the target air volume $Q_{ref}$ ranges from 1% to 2%.

Increasing or decreasing the rotational speed n through the motor controller in step 6) means increasing or decreasing the rotational speed n according to step length sequence of at least 1% $n_{max}$ each time, or new rotational speed=current rotational speed×(target air volume $Q_{ref}$/current calculated air volume $Q_c$).

The derivation process of the functional relation formula Q=F (T, n, V) is as follows.

The fan laws indicate that, under certain conditions, the air volume is proportional to the rotational speed, that is, $$\frac{Q_1}{Q_2} = \frac{n_1}{n_2};$$

the external air pressure of the fan is proportional to the square of the rotational speed, that is, $$\frac{P_1}{P_2} = \left(\frac{n_1}{n_2}\right)^2;$$

the output torque of the motor, i.e., the input torque of the fan, is proportional to the square of the rotational speed, that is, $$\frac{T_1}{T_2} = \left(\frac{n_1}{n_2}\right)^2 = \left(\frac{Q_1}{Q_2}\right)^2;$$

n represents the rotational speed of the motor, Q represents air volume, P represents the external air pressure rise of the fan, T represents the output torque of the motor, i.e., the input torque of the fan.

For convenient derivation, the relation formula between the air volume and torque under a base rotational speed is as follows:

$$Q_{equiv} = c0 + c1 \times T,$$

or (if a quadratic polynomial is used)

$$Q_{equiv} = c0 + c1 \times T + c2 \times T^2.$$

From the formula above, by combining the fan laws, the relationship between the torque and air volume can be further derived under an arbitrary rotational speed. Thus, it is needed to derive the equivalent torque when the rotational speed n=$n_{base}$, and then the air volume is converted into a new rotational speed according to the fan laws:

$$T_{base} = T \times \left(\frac{n_{base}}{n}\right)^2.$$

Put the relation formula into the equation under a base rotational speed, if a linear relation formula is used, then $$Q(T, n) = Q_{base} \times \frac{n}{n_{base}} = \left[c0 + c1 \times T \times \left(\frac{n_{base}}{n}\right)^2\right] \times \frac{n}{n_{base}}.$$

If a quadratic polynomial is used, then $$Q(T, n) =$$

$$Q_{base} \times \frac{n}{n_{base}} = \left[c0 + c1 \times T \times \left(\frac{n_{base}}{n}\right)^2 + c2 \times T^2 \times \left(\frac{n_{base}}{n}\right)^4\right] \times \frac{n}{n_{base}}.$$

From the experimental results, the device for testing air volume is always used for dynamically regulating back pressure for controlling the external static pressure, it causes that the fan laws is invalid in the whole range of air volume, thus an adjustment coefficient V is required to be added in the formula above. The formula after adjustment is as follows.

If a linear relation formula is used, then $$Q = c0 \times \frac{n \times V}{n_{base}} + c1 \times T \times \frac{n_{base}}{n \times V};$$

If a quadratic polynomial is used, then $$Q = c0 \times \frac{n \times V}{n_{base}} + c1 \times T \times \frac{n_{base}}{n \times V} + c2 \times T^2 \times \left(\frac{n_{base}}{n \times V}\right)^3.$$

The value of the adjustment coefficient V is changed between 0.1 and 2, and the selecting principle is that the air volume value calculated from the formula above is equal or similar to the actual test value. Table 1 is a value table for the adjustment coefficient V of a load.

TABLE 1

Values of adjustment coefficient V of a load

| | \multicolumn{8}{c}{N (RPM)} |
|---|---|---|---|---|---|---|---|---|
| | 500 | 600 | 700 | 800 | 900 | 1000 | 1100 | 1200 |
| V | 0.6 | 0.74 | 0.89 | 0.95 | 1 | 1.04 | 1.08 | 1.11 |

The rotational speed values are selected to be 500, 600, 700, 800, 900, 1000, 1200 RPM, and the corresponding adjustment coefficient V values are also recorded in Table 1, and the V value can be calculated through linear interpolation of the V value of two adjacent Vs under other working conditions of unmeasured rotational speed.

A calculation formula above is premised on selecting a base rotational speed $n_{base}$ for deriving the functional relation formula between the air volume and torque under the rotational speed. Therefore, the calculating precision is ensured, and from the point of calculation amount simplification, the function can be linear, that is, $$Q_{equiv} = c0 + c1 \times T,$$

or a quadratic polynomial, that is, $$Q_{equiv} = c0 + c1 \times T + c2 \times T^2.$$

The experimental data show that the problem of "excessive curve fitting" will be raised if a higher-order function is used to describe the relationship between the air volume and torque, i.e., the phenomenon that the calculation amount is increased, but the fitting precision is not enhanced. With this function, the calculating function formula Q=F (T, n, V) for calculating the air volume can be further derived under any other rotational speed and torque. The value of the adjustment coefficient V is also different under different rotational speed values. Therefore, the working state of constant rotational speed of the motor is required to be set, and the values of a plurality of rotational speed values n comprising the base rotational speed are selected in the range of without exceeding the maximum rotational speed, so that the motor works under different rotational speeds n, and the external static pressure of the system is changed in sequence for collecting the raw data comprising torque and air volume parameters. The test result of part of the raw data of a load is shown in Table 2 below.

TABLE 2

Part of raw data of a load

| Rotational speed n (RPM) | Static pressure (Pa) | Actual test value of air volume Q (CFM) | Torque (Oz-ft) |
| --- | --- | --- | --- |
| 1200 | 262.5 | 1254.0 | 44.70 |
| 1200 | 275 | 1204.7 | 44.17 |
| 1200 | 287.5 | 1134.1 | 41.19 |
| ... | ... | ... | ... |
| ... | ... | ... | ... |
| ... | ... | ... | ... |
| 1000 | 50 | 1566.7 | 49.41 |
| 1000 | 75 | 1490.8 | 45.91 |
| 1000 | 100 | 1409.7 | 42.13 |
| 900 | 25 | 1446.7 | 38.79 |
| 900 | 50 | 1362.5 | 35.43 |
| 900 | 75 | 1272.8 | 32.03 |

The corresponding adjustment coefficients V under different rotational speed values in Table 1 are obtained through the raw data, and the selecting principle is that the air volume value calculated from the formula above is equal or similar to the actual test value.

Figure 4:
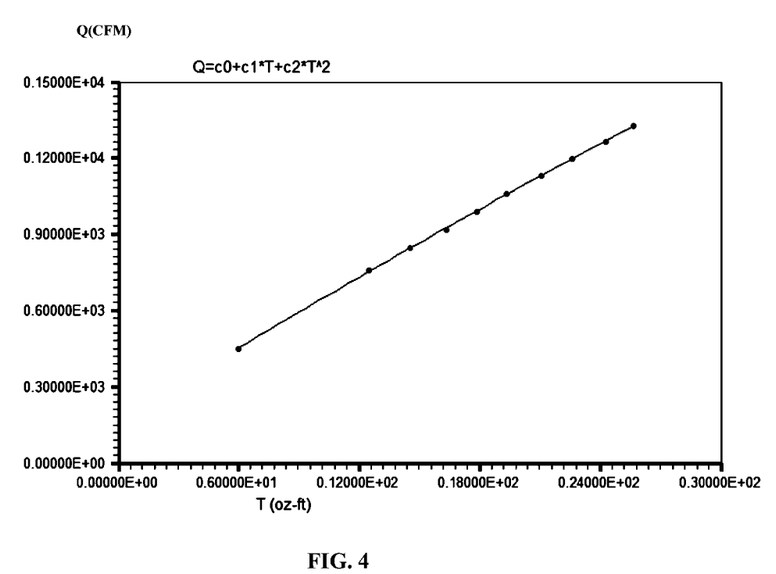
FIG. 4 is a straight line fitting diagram of measured data on a load.

The following example illustrates the control process to provide constant air volume:

1) after obtaining the raw data, taking data in Table 2 as an example, selecting the base rotational speed (n=900 RPM), carrying out drawing and straight-line fitting based on data of torque T and actual test value of air volume Q, establishing a function relation formula $Q_{base}$=F (T) for calculating air volume under the base rotational speed. Taking a linear relation formula under the base rotational speed as an example:

$$Q_{equiv} = c0 + c1 \times T + c2 \times T^2,$$

so as to be drawn into an image shown in FIG. 4; obtaining two air volume coefficients c0 and c1 by a curve fitting method; on the basis of raw data, determining the V values under all the rotational speeds according to the V value selecting principle that "The calculated air volume value is equal or similar to the actually measured air volume value", as shown in Table 1. At the moment, the function relation formula Q=F (T, n, V) for calculating air volume under any rotational speed and rotational speed can be determined as follows:

$$Q = c0 \times \frac{n \times V}{n_{base}} + c1 \times T \times \frac{n_{base}}{n \times V} + c2 \times T^2 \times \left(\frac{n_{base}}{n \times V}\right)^3.$$

Figure 5:
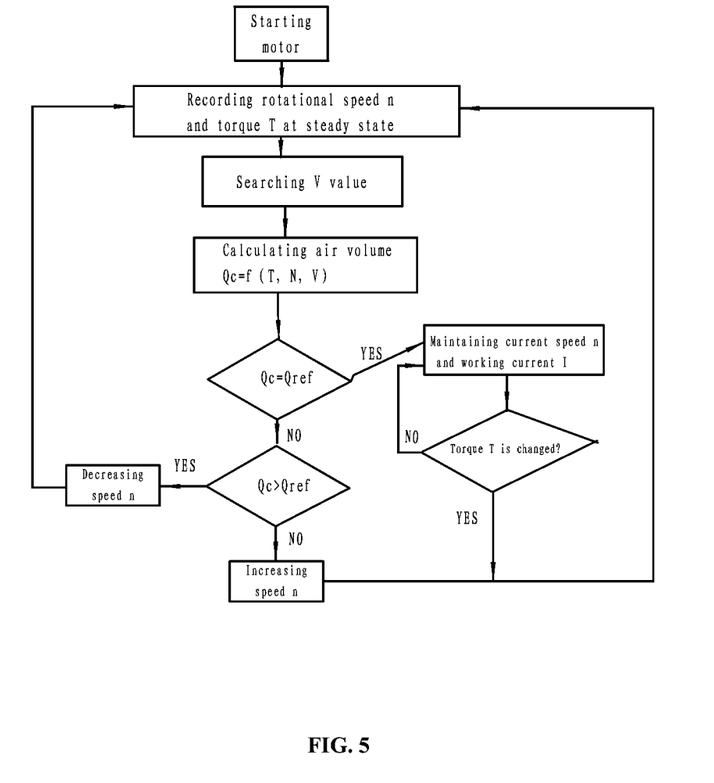
FIG. 5 is a part of flowchart of a method for controlling air volume in accordance with one embodiment of the invention.

Q represents air volume (CFM), T represents torque (oz-ft), n represents rotational speed (RPM), and V represents adjustment coefficient, as shown in Table 1, and the V values are input to the microprocessor control unit of the motor controller in advance;

2) the air-conditioning system controller inputting the target air volume $Q_{ref}$ into the microprocessor controller of the motor;

steps 3)-8) are shown in FIG. 5.

3) starting the motor by the motor controller and allowing the motor to work in a steady state under a certain rotational speed;

4) recording the torque T and the rotational speed n in the steady state, acquiring the adjustment coefficient V under the rotational speed n through a table look-up method, and calculating an air volume $Q_c$ in the steady state according to the functional relation formula in step 1);

5) comparing the target air volume $Q_{ref}$ with the calculated air volume $Q_c$ by the microprocessor control unit of the motor controller, and a) maintaining the rotational speed and allowing the motor to work in the steady state and recording the torque T when the target air volume $Q_{ref}$ is equal or equivalent to the calculated air volume $Q_c$; or b) increasing the rotational speed n through the motor controller when the target air volume $Q_{ref}$ is greater than the calculated air volume $Q_c$, or c) decreasing the rotational speed n through the microprocessor control unit of the motor controller when the target air volume $Q_{ref}$ is smaller than the calculated air volume $Q_c$;

6) re-recording a steady torque T after the motor falls on a new steady state under an increased or reduced rotational speed, re-searching the corresponding adjustment coefficient V by the motor controller through the table look-up method, and recalculating the air volume $Q_c$ in the new steady state; and 7) repeating the step 5) and step 6) to adjust the rotational speed until the calculated air volume $Q_c$ is equal or equivalent to the target air volume $Q_{ref}$, and recording the torque T in the steady state after the motor falls on the steady state. When the torque and the air output volume change due to the alteration of an external system, the motor controller compares the new steady torque with the torque in step 5) or step 7) to acquire the change of air output volume, and then steps 4), 5), 6), and 7) are repeated.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling air volume provided by a motor, the method comprising:

1) inputting a target air volume $Q_{ref}$ into a microprocessor control unit of a motor controller;

2) starting the motor by the motor controller and allowing the motor to work in a steady state under a rotational speed;

3) recording a torque and a rotational speed n in the steady state, acquiring an adjustment coefficient V under the rotational speed n through a table look-up method, establishing a functional relation formula Q=F (T, n, V) for calculating the air volume, Q representing the air volume, T representing the torque, n representing the rotational speed, V representing the adjustment coefficient, and each rotational speed section having a corresponding adjustment coefficient, and calculating an air volume Qc in the steady state;

4) comparing the target air volume $Q_{ref}$ with the calculated air volume Qc by the microprocessor control unit of the motor controller, and a) maintaining the rotational speed, allowing the motor to work in the steady state and recording the torque T when the target air volume $Q_{ref}$ is equal or equivalent to the calculated air volume Qc, or b) increasing the rotational speed n through the motor controller when the target air volume $Q_{ref}$ is greater than the calculated air volume Qc, or c) decreasing the rotational speed n through the microprocessor control unit of the motor controller when the target air volume $Q_{ref}$ is smaller than the calculated air volume Qc;

5) re-recording a steady torque T after the motor falls on a new steady state under an increased or reduced rotational speed, re-searching the corresponding adjustment coefficient V by the motor controller through the table look-up method, and recalculating the air volume Qc in the new steady state; and 6) repeating step 4) and step 5) to adjust the rotational speed until the calculated air volume Qc is equal or equivalent to the target air volume Qref, and recording the torque T in the steady state after the motor falls on the steady state.

2. The method of claim 1, wherein when the torque and air output volume change due to the alteration of an external system, the motor controller compares the new steady torque with the torque in step 4) or step 6) to acquire the change of air output volume, and then steps 3), 4), 5), and 6) are repeated.

3. The method of claim 1, wherein a calculation formula for calculating the air volume is as follows:

$$Q = c0 \times \frac{n \times V}{n_{base}} + c1 \times T \times \frac{n_{base}}{n \times V},$$

or $$Q = c0 \times \frac{n \times V}{n_{base}} + c1 \times T \times \frac{n_{base}}{n \times V} + c2 \times T^2 \times \left(\frac{n_{base}}{n \times V}\right)^3,$$

in which coefficients c0, c1, and c2 are obtained by a curve fitting method under different external static pressures of base rotational speed $n_{base}$ according to the raw data of the torque and air volume parameters.

4. The method of claim 3, wherein the base rotational speed $n_{base}$ ranges from 30% $n_{max}$ to 80% $n_{max}$, and $n_{max}$ represents a maximum rotational speed of the motor.

5. The method of claim 1, wherein a value of the adjustment coefficient V in the functional relation formula Q=F (T, n, V) ranges from 0.1 to 2.

6. The method of claim 3, wherein a value of the adjustment coefficient V in the functional relation formula Q=F (T, n, V) ranges from 0.1 to 2.

7. The method of claim 1, wherein that the calculated air volume $Q_c$ is equal or equivalent to the target air volume $Q_{ref}$ in step 4) and step 6) means that the calculated air volume $Q_c$ is in the range of "target air volume $Q_{ref}$±error window", and the error window of the target air volume $Q_{ref}$ ranges from 1% to 2%.

8. The method of claim 3, wherein that the calculated air volume $Q_c$ is equal or equivalent to the target air volume $Q_{ref}$ in step 4) and step 6) means that the calculated air volume $Q_c$ is in the range of "target air volume $Q_{ref}$±error window", and the error window of the target air volume $Q_{ref}$ ranges from 1% to 2%.

9. The method of claim 1, wherein increasing or decreasing the rotational speed n through the motor controller in step 4) means increasing or decreasing the rotational speed n according to step length sequence of at least 1% $n_{max}$ each time, or new rotational speed=current rotational speed× (target air volume $Q_{ref}$/current calculated air volume $Q_c$).

10. The method of claim 3, wherein increasing or decreasing the rotational speed n through the motor controller in step 4) means increasing or decreasing the rotational speed n according to step length sequence of at least 1% $n_{max}$ each time, or new rotational speed=current rotational speed× (target air volume $Q_{ref}$/current calculated air volume $Q_c$).

11. The method of claim 1, wherein the functional relation formula Q=F (T, n, V) is acquired as follows according to raw data of torque and air volume parameters under a base rotational speed $n_{base}$ and other rotational speed values and under different external static pressures:
   a) arranging the motor fixed on a blower wheel in an air-conditioning device;
   b) allowing the motor to work in the constant rotational speed;
   c) selecting a plurality of rotational speed values comprising the base rotational speed within the maximum rotational speed;
   d) allowing the motor to work under different rotational speed values; and
   e) changing the external static pressures of the system in sequence to collect the raw data comprising the torque and the air volume parameters.

12. A method for controlling air volume provided by an air-conditioning fan system, the air-conditioning fan system comprising a blower wheel and a motor, the motor comprising a motor controller, a stator component, and a rotor component, and the method comprising:

1) inputting a target air volume $Q_{ref}$ into a microprocessor control unit of the motor controller;

2) starting the motor by the motor controller and allowing the motor to work in a steady state under a rotational speed;

3) recording a torque T and a rotational speed n in the steady state, acquiring an adjustment coefficient V under the rotational speed n through a table look-up method, establishing a functional relation formula Q=F (T, n, V) for calculating the air volume, Q representing the air volume, T representing the torque, n representing a rotational speed, V representing an adjustment coefficient, and each rotational speed section having a corresponding adjustment coefficient, and calculating an air volume Qc in the steady state;

4) comparing the target air volume Qref with the calculated air volume Qc by the microprocessor control unit of the motor controller, and a) maintaining the rotational speed, allowing the motor to work in the steady state and recording the torque T when the target air volume Qref is equal or equivalent to the calculated air volume Qc; or b) increasing the rotational speed n through the motor controller when the target air volume Qref is greater than the calculated air volume Qc, or c)

decreasing the rotational speed n through the microprocessor control unit of the motor controller when the target air volume Qref is smaller than the calculated air volume Qc;

5) re-recording a steady torque after the motor falls on a new steady state under an increased or reduced rotational speed, re-searching the corresponding adjustment coefficient V by the motor controller through the table look-up method, and recalculating the air volume Qc in the new steady state; and 6) repeating step 4) and step 5) to adjust the rotational speed until the calculated air volume Qc is equal or equivalent to the target air volume Qref, and recording the torque T in the steady state after the motor falls on the steady state.

13. The method of claim 12, wherein when the torque and the air output volume change due to the alteration of an external system, the motor controller compares the new steady torque with the torque in step 4) or step 6) to acquire the change of air output volume, and then steps 3), 4), 5), and 6) are repeated.

14. The method of claim 12, wherein a calculation formula for calculating air volume is as follows:

$$Q = c0 \times \frac{n \times V}{n_{base}} + c1 \times T \times \frac{n_{base}}{n \times V},$$

or $$Q = c0 \times \frac{n \times V}{n_{base}} + c1 \times T \times \frac{n_{base}}{n \times V} + c2 \times T^2 \times \left(\frac{n_{base}}{n \times V}\right)^3,$$

in which coefficients c0, c1, and c2 are obtained by a curve fitting method under different external static pressures of base rotational speed $n_{base}$ according to the raw data of the torque and air volume parameters.

15. The method of claim 14, wherein the base rotational speed $n_{base}$ ranges from 30% $n_{max}$ to 80% $n_{max}$, and $n_{max}$ represents a maximum rotational speed of the motor.

16. The method of claim 12, wherein the value of the adjustment coefficient V in the functional relation formula Q=F (T, n, V) ranges from 0.1 to 2.

17. The method of claim 14, wherein the value of the adjustment coefficient V in the functional relation formula Q=F (T, n, V) ranges from 0.1 to 2.

18. The method of claim 12, wherein that the calculated air volume $Q_c$ is equal or equivalent to the target air volume $Q_{ref}$ in step 4) and step 6) means that the calculated air volume $Q_c$ is in the range of "target air volume $Q_{ref}$±error window", and the error window of the target air volume $Q_{ref}$ ranges from 1% to 2%.

19. The method of claim 14, wherein that the calculated air volume $Q_c$ is equal or equivalent to the target air volume $Q_{ref}$ in step 4) and step 6) means that the calculated air volume $Q_c$ is in the range of "target air volume $Q_{ref}$±error window", and the error window of the target air volume $Q_{ref}$ ranges from 1% to 2%.

20. The method of claim 12, wherein increasing or decreasing the rotational speed n through the motor controller in step 4) means increasing or decreasing the rotational speed n according to step length sequence of at least 1% $n_{max}$ each time, or new rotational speed=current rotational speed× (target air volume $Q_{ref}$/current calculated air volume $Q_c$).

* * * * *